United States Patent
Zhang et al.

(10) Patent No.: US 10,542,391 B2
(45) Date of Patent: Jan. 21, 2020

(54) METHOD AND APPARATUS TO EFFICIENTLY SUPPORT GROUP CALL CONFIRMATION

(71) Applicant: MOTOROLA SOLUTIONS, INC, Chicago, IL (US)

(72) Inventors: Zhi-Chao Zhang, Chengdu (CN); Yi Peng, Chengdu (CN); Ya-Ming Wu, Chengdu (CN); Jin-Qing Ye, Chengdu (CN); Hong-Hong Zhu, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 73 days.

(21) Appl. No.: 15/326,765

(22) PCT Filed: Aug. 26, 2014

(86) PCT No.: PCT/CN2014/085208
§ 371 (c)(1),
(2) Date: Jan. 17, 2017

(87) PCT Pub. No.: WO2016/029360
PCT Pub. Date: Mar. 3, 2016

(65) Prior Publication Data
US 2017/0201868 A1 Jul. 13, 2017

(51) Int. Cl.
*H04L 29/04* (2006.01)
*H04M 3/56* (2006.01)
(Continued)

(52) U.S. Cl.
CPC .............. *H04W 4/10* (2013.01); *H04L 67/26* (2013.01); *H04M 1/27* (2013.01)

(58) Field of Classification Search
None
See application file for complete search history.

(56) References Cited

U.S. PATENT DOCUMENTS

| 5,634,196 A | 5/1997 | Alford |
| 6,353,730 B1 | 3/2002 | Buettner et al. |
| (Continued) | | |

FOREIGN PATENT DOCUMENTS

| CN | 101103647 A | 1/2008 |
| CN | 101494883 A | 7/2009 |
| WO | 2007024280 A2 | 3/2007 |

OTHER PUBLICATIONS

The PCT International Search Report and the Written Opinion, corresponding application No. PCTCN2014/086208, filed Aug. 26, 2014, all pages.

(Continued)

*Primary Examiner* — Duc T Duong
(74) *Attorney, Agent, or Firm* — Daniel R. Bestor

(57) ABSTRACT

A method in a call information server for a two-way radio system includes accessing, by the server, group list information associating the plurality of subscriber units with one or more groups; receiving, at the server, updates related to presence information, availability information, and the group list information; and confirming, by the server, for each particular subscriber unit indicated in a particular group list as forming a particular group, the particular subscriber unit's participation in a particular group call to the particular group, as a function of the presence information, the availability information, and the group list information. A call information server and a two-way radio system are also disclosed.

15 Claims, 14 Drawing Sheets

(51) Int. Cl.
*H04W 4/10* (2009.01)
*H04L 29/08* (2006.01)
*H04M 1/27* (2006.01)

(56) References Cited

U.S. PATENT DOCUMENTS

| | | | |
|---|---|---|---|
| 7,409,050 B1 | 8/2008 | Li et al. | |
| 7,711,384 B1 | 5/2010 | Szuszczewicz et al. | |
| 8,180,036 B2 | 5/2012 | Plas et al. | |
| 9,154,921 B2* | 10/2015 | Vij | H04W 4/06 |
| 2002/0118808 A1* | 8/2002 | Kelleher | H04M 3/56 |
| | | | 379/202.01 |
| 2003/0017836 A1* | 1/2003 | Vishwanathan | H04L 29/06 |
| | | | 455/517 |
| 2003/0119540 A1* | 6/2003 | Mathis | H04M 3/42365 |
| | | | 455/518 |
| 2004/0141606 A1* | 7/2004 | Torvinen | H04M 3/42374 |
| | | | 379/202.01 |
| 2005/0010658 A1* | 1/2005 | Nettamo | H04L 29/06 |
| | | | 709/223 |
| 2005/0047561 A1 | 3/2005 | Seiferth | |
| 2005/0176454 A1* | 8/2005 | Chakraborty | H04M 1/72522 |
| | | | 455/518 |
| 2006/0025122 A1 | 2/2006 | Harris et al. | |
| 2006/0128411 A1* | 6/2006 | Turcanu | H04M 3/56 |
| | | | 455/518 |
| 2006/0182242 A1* | 8/2006 | Henry | H04L 67/24 |
| | | | 379/114.01 |
| 2006/0232663 A1* | 10/2006 | Gandhi | H04L 51/38 |
| | | | 348/14.02 |
| 2006/0287005 A1 | 12/2006 | Benco et al. | |
| 2007/0047715 A1* | 3/2007 | Madhusudan | H04M 3/56 |
| | | | 379/202.01 |
| 2007/0155415 A1 | 7/2007 | Sheehy et al. | |
| 2008/0160980 A1 | 7/2008 | Harris et al. | |
| 2008/0207177 A1* | 8/2008 | Shukla | H04W 76/45 |
| | | | 455/413 |
| 2009/0017802 A1 | 1/2009 | Zhang et al. | |
| 2009/0248799 A1* | 10/2009 | Gavita | H04L 51/04 |
| | | | 709/204 |
| 2010/0086112 A1 | 4/2010 | Jiang et al. | |
| 2010/0112953 A1 | 5/2010 | Harris | |
| 2010/0210249 A1* | 8/2010 | Gisby | H04M 3/5158 |
| | | | 455/414.1 |
| 2011/0143803 A1 | 6/2011 | Trifiletti | |
| 2013/0196705 A1 | 8/2013 | Nosou et al. | |
| 2014/0267580 A1* | 9/2014 | Parent | H04N 7/141 |
| | | | 348/14.12 |
| 2014/0272814 A1 | 9/2014 | Parent et al. | |
| 2015/0117397 A1 | 4/2015 | Ofir et al. | |
| 2015/0237483 A1* | 8/2015 | Shimizu | H04W 4/10 |
| | | | 455/512 |
| 2015/0271650 A1* | 9/2015 | Osanai | H04M 3/56 |
| | | | 455/518 |
| 2017/0142259 A1* | 5/2017 | Schmitz | H04W 4/21 |
| 2017/0302780 A1* | 10/2017 | Rathod | H04L 12/1818 |

OTHER PUBLICATIONS

Du, Q.W. et al.: Method to detect missed voice call, Motorola Solutions, Inc., Published: Sep. 10, 2013, all pages.

* cited by examiner

| CALL ID | CALL TYPE | ASSOCIATED SU NUMBER | ASSOCIATED SU LIST | PRESENT SU LIST | NOT PRESENT SU LIST | P & U SU LIST |
|---|---|---|---|---|---|---|
| TG 1 | GROUP | 5 | SU1,SU2,SU3, SU4,SU5 | SU1,SU2,SU3 | SU4,SU5 | SU1,SU2,SU3 |
| TG 2 | GROUP | 2 | SU2,SU3 | SU2,SU3 | | SU2,SU3 |
| SU 5 | PRIVATE | 2 | SU4,SU5 | SU4,SU5 | | SU4,SU5 |
| | | INFO FROM GROUP CALL SERVER OR OTA UPDATE | | INFO FROM INFRASTRUCTURE OR PN SERVER | INFO FROM INFRASTRUCTURE | INFO FROM INFRASTRUCTURE |

*FIG. 3*

| PF | RES | OPCODE GROUP VOICE CALL REQUEST CONFIRM |
|----|-----|------------------------------------------|
| | | FID=MOTOROLA |
| | | SOURCE ADDRESS |
| | | SU ID1(BYTE 1) |
| | | SU ID1(BYTE 2) |
| | | SU ID1(BYTE 3) |
| | | SU ID2(BYTE 1) |
| | | CRC |

| PF | RES | OPCODE GROUP VOICE CALL REQUEST CONFIRM CONT |
|----|-----|-----------------------------------------------|
| | | FID=MOTOROLA |
| | | SU ID2(BYTE 2) |
| | | SU ID2(BYTE 3) |
| | | |

*FIG. 7*

| PF | RES | OPCODE GROUP VOICE CALL REQUEST CONFIRM |
|---|---|---|
| | | FID=MOTOROLA |
| | | SOURCE ADDRESS |
| | | SU ID1(BYTE 1) |
| | | SU ID2(BYTE 1) |
| | | SU ID3(BYTE 1) |
| | | SU ID4(BYTE 1) |
| | | CRC |

| PF | RES | OPCODE GROUP VOICE CALL REQUEST CONFIRM CONT |
|---|---|---|
| | | FID=MOTOROLA |
| | | REMAIN IDs |

FIG. 8

| PF | RES | OPCODE GROUP VOICE CALL REQUEST CONFIRM |
|---|---|---|
| | | FID=MOTOROLA |
| | | SOURCE ADDRESS |
| | | NOT AVAIL SU BITMASK |

| PF | RES | OPCODE GROUP VOICE CALL REQUEST CONFIRM CONT |
|---|---|---|
| | | FID=MOTOROLA |
| | | NOT AVAIL SU BITMASK |
| | | E.G. 256 BIT |

| PF | RES | OPCODE<br>GROUP VOICE CALL PARTICIPANT ECHO |
|----|-----|---------------------------------------------|
| MFID=MOTOROLA ||| 
| SERVICE OPTIONS |||
| SOURCE ADDRESS |||
| UNAVAILABLE SU # |||
| BUSY SU # |||
| LATE ENTRY SU # |||

FIG. 11

METHOD AND APPARATUS TO EFFICIENTLY SUPPORT GROUP CALL CONFIRMATION

This application is a National Stage filing under 35 USC § 371 of co-pending Patent Cooperation Treaty international application having Serial No. PCT/CN14/85208 (the 'PCT international application') filed on Aug. 26, 2014. This application claims priority to the PCT international application, the entire contents of which are incorporated herein by reference.

BACKGROUND OF THE INVENTION

In two-way radio systems, a plurality of subscribers, each with an associated subscriber unit (SU), wirelessly communicate to infrastructure such as various Base Transceiver Stations (BTSs), repeaters, etc. Examples of the two-way radio systems can include European Telecommunications Standards Institute Digital Mobile Radio (ETSI-DMR), Terrestrial Trunked Radio (TETRA), Project 25 (P25), Land Mobile Radio (LMR), and the like. The SU is a mobile device that is configured to communicate in a two-way radio system, and the plurality of subscribers are each users with their associated SU.

In the two-way radio system, a call initiator, with an SU, can make a group call by requesting the group call for the specified subscribers or group. For example, the group call may be a group voice call and the specified subscribers may be members of a group, i.e. an assigned group of subscribers. Disadvantageously, in conventional group call situations, the group call is unconfirmed and it is not possible for the call initiator to determine if the group call has reached all of the subscribers associated with (e.g., subscribed to) the group. For example, the group call could fail to reach some or all of the associated subscribers for various reasons such as some of the subscribers are out of range or powered off, some of the subscribers are participating in other calls, some of the subscribers are disabled, etc.

Conventionally, there have been attempts to remedy these limitations. For example, in some two-way radio systems, a presence notification (PN) server is used to track whether or not SUs are in the system, i.e., presence information. This can be done via over-the-air (OTA) interfaces between the SUs and the PN server, and the PN server is aware of the presence of the SUs in the system. However, the PN server is only aware of whether or not the SUs are present somewhere in the system and cannot tell if a group call actually reaches a particular subscriber associated with the group. For example, the group call may not reach the particular subscriber for various reasons such as when the particular subscriber is already participating in another group or a separate private call.

Accordingly, there is a need for an improved method and apparatus for group call confirmation in two-way radio systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an example of a call status table that may get generated and updated by the call information server in the two-way radio system of FIG. 1 in accordance with some embodiments.

FIGS. 6-9 are block diagrams of various CSBKs for use with the processes described herein in accordance with some embodiments.

FIG. 11 is a block diagram of a Link Control (LC) format for a group voice call request confirm in the process of FIG. 10 in accordance with some embodiments.

Figure 1:
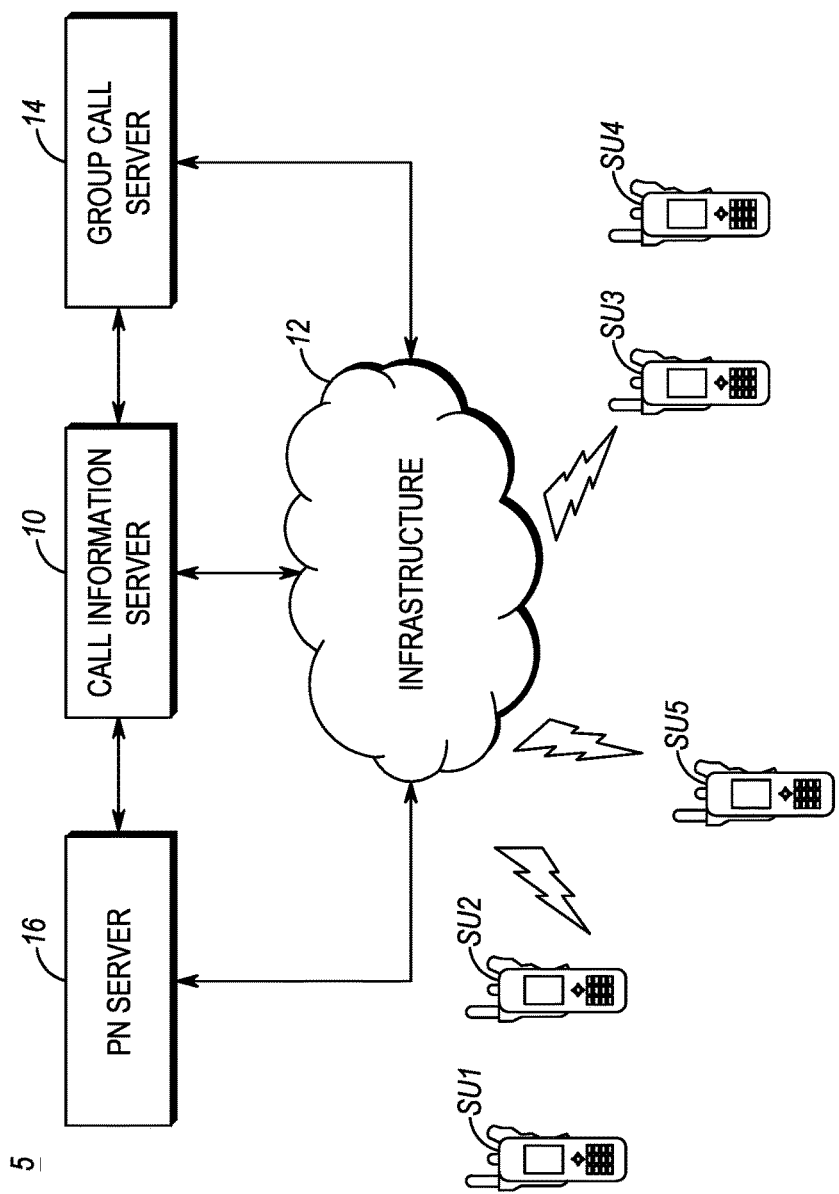
FIG. 1 is a network diagram of a two-way radio system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method in a call information server for a two-way radio system includes accessing, by the server, group list information associating the plurality of subscriber units with one or more groups; receiving, at the server, updates related to presence information, availability information, and the group list information; and confirming, by the server, for each particular subscriber unit indicated in a particular group list as forming a particular group, the particular subscriber unit's participation in a particular group call to the particular group, as a function of the presence information, the availability information, and the group list information.

In another exemplary embodiment, a call information server in a two-way radio system includes a network interface communicatively coupled to a plurality of subscriber unit through infrastructure of the two-way radio system; a processor communicatively coupled to the network interface; and memory storing computer executable instructions, and in response to execution by the processor, the computer executable instructions cause the processor to perform steps of: access group list information associating the plurality of subscriber units with one or more groups; receive, via the network interface, updates related to presence information, availability information, and the group list information; and confirm, for each particular subscriber unit indicated in a particular group list as forming a particular group, the particular subscriber unit's participation in a particular group call to the particular group, as a function of the presence information, the availability information, and the group list information.

In yet another exemplary embodiment, a two-way radio system includes a plurality of subscriber units communicatively coupled to an infrastructure; and a call information server communicatively coupled to the plurality of subscribers via a network interface, wherein the call information server comprises memory storing computer executable instructions, and in response to execution by a processor, the computer executable instructions cause the processor to perform steps of: access group list information associating the plurality of subscriber units with one or more groups; receive, via the network interface, updates related to presence information, availability information, and the group list information; and confirm, for each particular subscriber unit indicated in a particular group list as forming a particular group, the particular subscriber unit's participation in a particular group call to the particular group, as a function of the presence information, the availability information, and the group list information.

In various exemplary embodiments, the method and apparatus described herein include a call information server that provides a fast and accurate mechanism to detect if a subscriber unit (SU) is present and/or available. The method and apparatus can inform call initiators of receive status of a group call during or after call setup. Advantageously, the call information server allows narrowband, two-way radio systems to have features available in broadband 4G systems—i.e., real-time availability information and presence information.

FIG. 1 is a network diagram of a two-way radio system 5 in accordance with some embodiments. The two-way radio system 5 includes a call information server (CIS) 10 communicatively coupled to infrastructure 12. The infrastructure 12 may include, without limitation, base stations, repeaters, access terminals, access points, servers, their supporting devices, etc. (the associated components of the infrastructure 12 are omitted for illustration purposes). Specifically, the infrastructure 12 facilitates wireless communication between a plurality of subscriber units (SUs) (labeled as SU1, SU2, SU3, SU4, SU5 in FIG. 1) for audio and/or data communications. The two-way radio system 5 can include ETSI-DMR, TETRA, P25, LMR, Long Term Evolution (LTE), GSM, CDMA, or any other type of two-way radio communication system. Additionally, the two-way radio system 5 can include a group call server 14 to facilitate group calls and a PN server 16 to maintain online/offline presence information available/unavailable availability information of the SUs. Note, the call information server 10, the group call server 14, and the PN server 16 can be implemented in a same or separate device(s), and in some embodiments, their functionality may be embodied within another device in the infrastructure, such as a zone controller or call controller.

In various exemplary embodiments, the call information server 10 provides functionality in the two-way radio system 5 to efficiently support group call confirmation. In an exemplary aspect, the call information server 10 tracks both the presence and availability of SUs. Additionally, the call information server 10 provides the SU presence information and availability information as a function of group list information. Generally, a SU may be configured to make individual calls (to another SU in a group) and/or group calls (to one or more SUs associated with or subscribed to a particular group); note, this SU making the call is referred to as the call initiator. A group is a predefined association of SUs in the two-way radio system 5 such that voice and/or data transmissions made by the initiator SU are received by each of the SUs associated with the group. Variously, the call information server 10 can be viewed as a SU presence and availability tracking device, providing presence information and availability information in the two-way radio system 5.

The call information server 10 tracks presence information and availability information of all of the SUs in the two-way radio system 5 based on continuous, periodic, semi-periodic, or requested updates from the SUs and/or other devices within the infrastructure 12. That is, the call information server 10 is configured to receive availability information updates and/or presence information updates. The call information server 10 is configured with group list information that may list which SUs are in which group and the call information server 10 receives call status information from the infrastructure 12 to determine which SUs are in which calls as well as updates to the group lists and active calls. The call information server 10 is then able to inform a group call initiator, either before the group call or after the group call, if SUs in the group will receive the call or have received the call, respectively.

The call information server 10 may collect information from the SUs via OTA interfaces through the infrastructure 12 and/or via the infrastructure 12 itself. Specifically, the SUs may report to the call information server 10 various SU presence impacting events such as power on, roaming to a new site in the infrastructure 12, power off, channel change, receiving a broadcast (C_BCAST) targeted to itself, receiving an acknowledgment (CNACKD) with a reason code indicating the SU is not registered, etc. Additionally or alternatively, the infrastructure 12 may report one or more of the presence impacting events above to the call information server 10 with or without SU participation. For example, in case the SU is faded out or losing power, the call information server 10 and/or the infrastructure 12 can implement a timeout mechanism to detect the presence or absence of the SU, e.g. if the SU does not report in a predefined time, the SU may be automatically declared offline.

Figure 14:
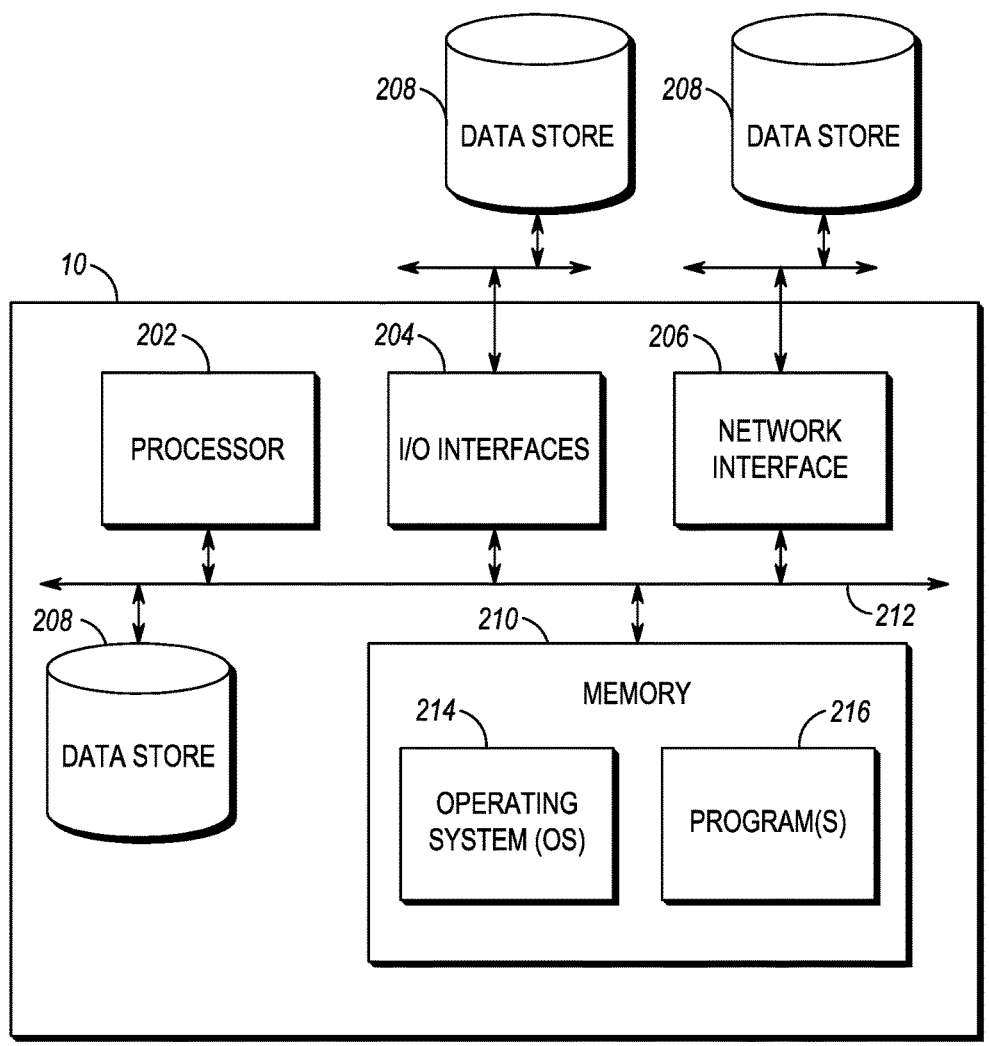
FIG. 14 is a block diagram of an exemplary implementation of a call information server accordance with some embodiments.

An exemplary implementation of the call information server 10 is illustrated in FIG. 14, and the call information server 10 manages various data structures to keep track of information associated with the SUs. For example, the call information server 10 can keep track of a presence of all of the SUs in a data store such as using the following data structure as a SU presence table:

TABLE 1

SU Presence Table

| SU ID | Presence Information |
|-------|---------------------|
| SU1   | online              |
| SU2   | online              |
| SU3   | offline             |
| . . . | . . .               | where the SU ID is a SU identifier uniquely identifying the SUs in the two-way radio system 5 and the status determines the presence information of the associated SU, i.e. either online (connected and registered) or offline (powered down, roaming, experiencing interference, out of range, etc.). In some embodiments, SUs that go offline may be removed from the presence list, while in others, the SU may simply be indicated as 'offline.' This presence information can come from the PN server 16, trunk controller, or the like, and may be generated or updated at SU registration or any other time prior to or subsequent to registration.

The SUs can join or leave groups through automatic or manual operation of the SU or an infrastructure device, such as by operation of the group call server 14. When a SU's group is changed, it can be reported to the call information server 10 in a format such as, for example: <SU ID, Ch ID, Rx Group List Changes> where Ch ID is a channel identifier in the two-way radio system 5, and Rx Group List Changes are the changes to the group or the new list of group(s) for that SU. The group call server 14 may be a processing device that is utilized to facilitate group calls, etc. The group call server 14 can also be referred to as a zone controller (ZC), trunk controller, or the like. If the group call server 14 has a connection to the call information server 10, updates to group membership can be reported over the connection, e.g. via Internet Protocol (IP) or at a local console, by a network administrator or the like. If the connection is unavailable, the group call server 14 can direct the SU to report the updates via an OTA interface through the infrastructure 12.

The call information server 10, based on information from the SUs and/or the group call server 14, can maintain a table (or any other data structure) of group lists. For example, the following is an exemplary table that can be maintained by the call information server 10 for group list information:

TABLE 2

Group List Information Table

| Group ID | Associated Number of SUs | Associated SU List |
|---|---|---|
| Group 1 | 5 | SU1, SU2, SU3, SU4, SU5 |
| Group 2 | 2 | SU2, SU3 |
| Group 3 | 2 | SU4, SU5 |
| . . . | . . . | . . . | where Group ID is a unique identifier of each group, associated number of SUs is a count of the number of SUs in the group, and associated SU list is a list of the SUs in the group (e.g., based on SU ID). The Group List Information in Table 2 only reflects "present" group members, and in other embodiments, may also include non-present SUs. In some embodiments, more or less information than that set forth in Table 2 may be maintained by the call information server 10. For example, in some embodiments, the Associated Number of SUs may not be separately listed. Note, there can be continual, periodic, semi-periodic, or request-based (e.g., polling) communication between the call information server 10 and the group call server 14 and/or the SUs. For example, if no information is found for a newly registered SU in the call information server 10, the call information server 10 can passively query the group call server 14 or send a request to the newly registered SU for an update.

Figure 2:
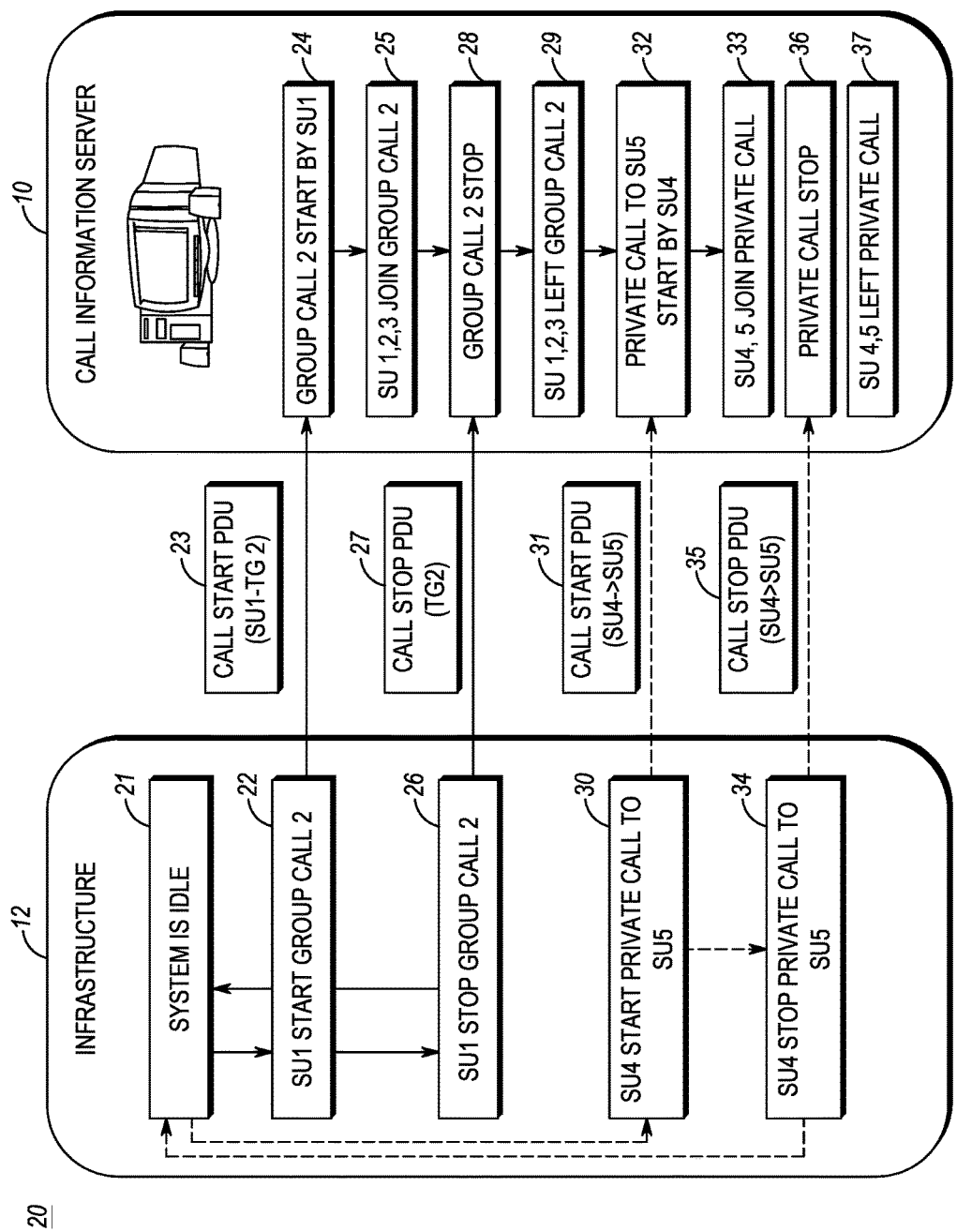
FIG. 2 is a flow diagram of an exemplary operation in the two-way radio system of FIG. 1 illustrating update tracking by a call information server in accordance with some embodiments.

FIG. 2 is a flow diagram of an exemplary operation 20 in the two-way radio system 5 illustrating call start/stop update tracking by the call information server 10 for purposes of determining SU availability information. Specifically, the operation 20 illustrates activity in the infrastructure 12, activity in the call information server 10, and activity between the call information server 10 and the infrastructure 12. During the operation 20, the infrastructure 12 will track and report call start/stop information to call information server 10 in a real-time or near-real-time manner. Initially, at a point 21, the two-way radio system 5 is idle. At a point 22, the SU1 starts a group call in group 2 with SU2 and SU3. At a point 23, when the infrastructure 12 grants a call, it sends a call start protocol data unit (PDU) to the call information server 10.

Note, the call start PDU contains all of the relevant details of the group call, such as that the call initiator is SU1, the group is group 2, etc. Specifically, a call start/stop PDU may contain the following information: {call initiator SU ID, target SU IDs (SUs required for the call), call type (group or private)}.

At points 24 and 25, the call information server 10 receives the call start PDU and updates its tables (or other data structures) to indicate that the SU1 has started a group call in group 2 and that SU1, SU2, SU3 have joined the group call. At a point 26, the SU1 stops the group call, the infrastructure 12 is now idle again (back to point 21), and at a point 27, a call stop PDU is sent to the call information server 10. At points 28 and 29, the call information server 10 receives the call stop PDU and updates its tables to indicate that the group call on the group 2 has stopped and the SU1, SU2, SU3 have left the group 2 call.

At a point 30, the SU4 starts a private call to the SU5 and a call start PDU is sent to the call information server 10 from the infrastructure 12 at the point 31, and the call start PDU can include the details that the private call is between the SU4, as the call initiator, and the SU5. At points 32 and 33, the call information server 10 receives the call start PDU and can update the table to indicate that the SU4 has made a private call to the SU5 and that SU4 and SU5 have joined the private call.

At a point 34, the SU4 stops the private call to the SU5, and the infrastructure 12 sends a call stop PDU at a point 35. At points 36 and 37, the call information server 10 receives the call stop PDU and updates the table to indicate that the private call has stopped and the SU4 and SU5 have left the private call.

The call information server 10 can use the information provided in the operation 20 to generate and maintain an in-call SU availability data structure (e.g., table in this case) which indicates which SUs are on calls and which are available for other calls. Specifically, when the call information server 10 receives the call start PDU, the call information server 10 can: 1) check the call information from the PDU (call initiator SU ID, target SU IDs and call type); 2) if this is a group call, the call initiator SU and participating radios associated with the group (the target SU IDs of all members of the group) can be added into the in-call SU availability table; 3) if this is an individual call, the call initiator SU and target SU can be added into the in-call SU availability table; 4) the call information server 10 can look up the associated SUs in the SU online/offline table and the group list information table to generate a record for the in-call SU availability table; and 5) the call information server 10 can add the record in the in-call SU availability table. For example, the in-call SU availability data structure can use the following format:

TABLE 3

In-Call SU Availability Table

| Source ID | Target ID | Call Type | In-Call SU |
|---|---|---|---|
| SU1 | GC2 | Group Call | SU1, SU2, SU3 |
| SU 4 | SU5 | Private Call | SU4, SU5 |
| . . . | . . . | . . . | . . . | where Source ID is the SU ID of the call initiator, Target ID are the SU IDs or group targets of the call, Call Type can be a group or private call, and In-Call SU are the SUs on the call. In some embodiments, more or less information than that set forth in Table 3 may be included in the In-Call SU availability table. The In-Call SU availability table can be used by the call information server 10 to determine the availability information for the SUs.

Importantly, the call information server 10 generates each record (e.g., a row) in the in-call SU table based on the call start PDU which tells the call information server 10 the relevant call information. Next, the call information server 10 adds information in the record based on the presence and availability of the SUs and based on the group list information of the SUs. When the call information server 10 receives a call stop PDU, the call information server 10 removes or otherwise nullifies the associated record in the in-call SU table.

FIG. 3 illustrates a call status table 40 that may get generated and updated by the call information server 10 in the two-way radio system 5. The call information server 10 can store the current information in any format, and the call status table 40 is just one exemplary format. In the example of FIG. 3, the call status table 40 includes: a Call ID indicating an identifier of the call, such as the call originator, the call target, or a group identifier of the call, or a randomly generated identifier; a call type (group or private); an associated number of SUs requested for the call; an associated SU list showing all the SUs associated with the particular Call ID; a present list showing the present SUs that are currently online; a not present list showing the SUs that are currently offline; and an in-call SU list showing the SUs participating in a call associated with the Call ID, i.e. SUs that are present, and currently in a call and thus unavailable for other calls. In some embodiments, more or less information than that set forth in FIG. 3 may be included in the call status table.

The call status table list can be obtained from the group call server 14 or from an OTA update, and the remaining information can be obtained from the infrastructure 12. Also, the presence SU table can be obtained from the PN server 18 in the two-way radio system 5. In this example, there are three calls—group 1 (G1), group 2 (G2) and a private call between SU5 and SU4. The SU4, SU5 are shown as being unavailable for the group 1 call because they are in a private call and thus unavailable to participate in the group 1 call. Subscriber units SU4 and SU5 may be unavailable for the group 1 call because, for example, the private call started before the group 1 call, or because the group 1 call is a lower priority call than the private call, and subscriber units SU4 and SU5 may have never been on any portion of the group 1 call, or may have left the group 1 call at some time during the call for the private call. Other possibilities exist as well.

Figure 4:
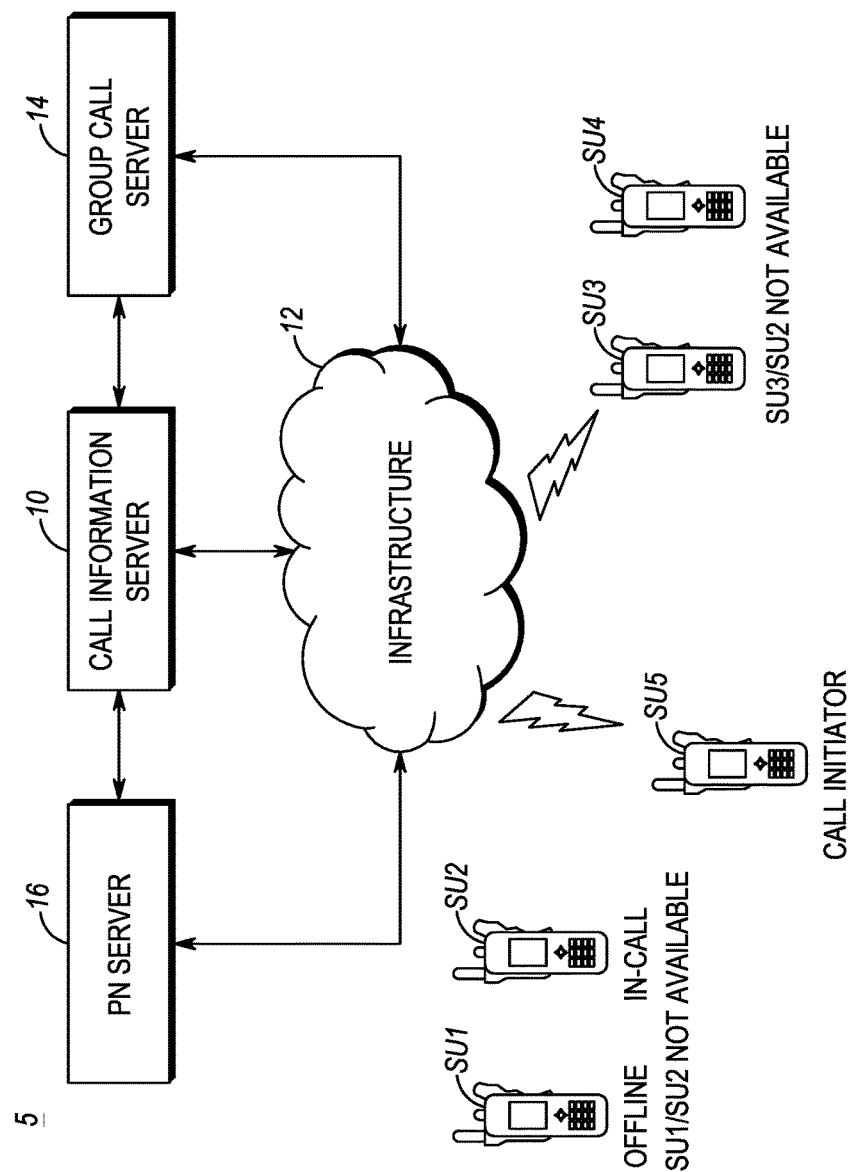
FIG. 4 is a network diagram of a group call confirmation with the call information server in accordance with some embodiments.

FIG. 4 is a network diagram of the two-way radio system 5 illustrating a group call confirmation with the call information server 10. In the example of FIG. 4, the SU5 is the group call initiator and the group call confirmation may include various modes—1) automatically start or stop the group call setup if all SU group members are not present and available, 2) automatically start or stop the group call setup if all present SU group members are not available, 3) inform the call initiator after the call of which SU group members were not present and/or unavailable with or without an option to continue the group call, or 3) provide the call initiator an indication following the call setup of which SU group members were not present and/or unavailable. As a result of the foregoing, group confirmation is made available to the initiating SU5.

Figure 5:
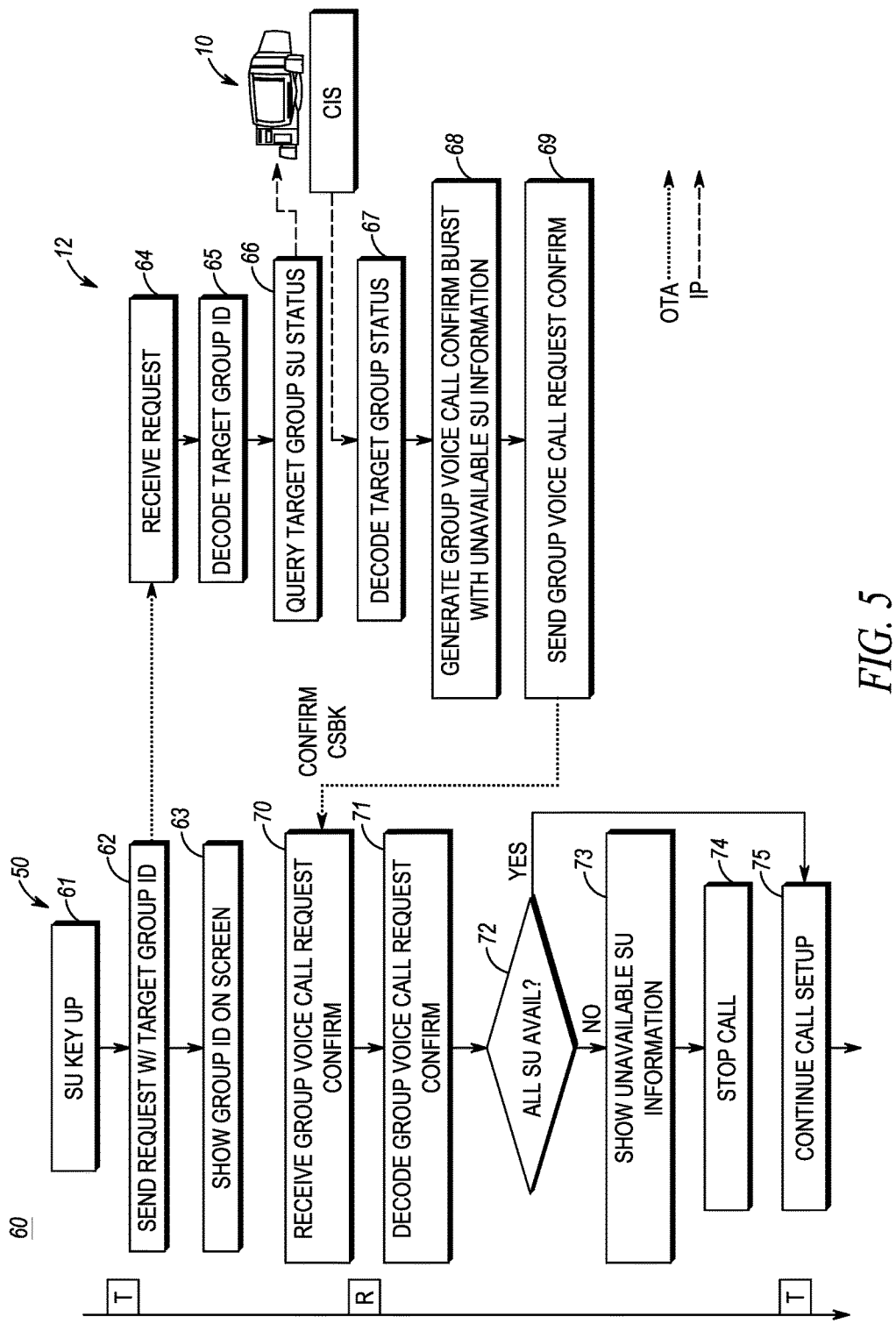
FIG. 5 is a flowchart of a process for group call confirmation during call setup in accordance with some embodiments.

FIG. 5 is a flowchart of a process 60 for group call confirmation during call setup. In some embodiments, more or fewer steps could be included in the process 60. The process 60 is shown with activity in an initiating SU 50, activity in the infrastructure 12, activity with the call information server 10, and activity between the SU 50 and the infrastructure 12. The process 60 includes the SU keying up (step 61) and the SU sending a request for a group voice call with a target group ID to the infrastructure 12 (step 62). Note also that the SU can visually display the target group ID on a screen of the SU (step 63). The infrastructure 12 receives the request such as at a base station via the OTA interface (step 64), decodes the target group ID (step 65), and queries the target group SU status (step 66). Here, the infrastructure 12 performs the query through the call information server 10 to get the target group SU status (step 66).

The infrastructure 12 receives a reply to its query and decodes the target group SU status (step 67). The infrastructure 12 generates a group voice call confirmation burst with unavailable SU information included (step 68). Here, the infrastructure 12, such as a Push-to-Talk (PTT) or a call server, can generate the call information along with additional information from the call information server 10, i.e. the unavailable SUs. The infrastructure 12 sends a group voice call request confirmation to the SU 50 via the OTA interface (step 69). Note, the group voice call request confirmation can also include the unavailable SUs. The group voice call request confirmation can be sent in an ETSI-DMR Control Signaling Block (CSBK). An exemplary format for the CSBK with the unavailable SUs is described below.

The SU 50 receives the group voice call request confirmation (step 70) and decodes the group voice call request confirmation (step 71). Next, the SU 50 checks if all the SUs present in the system and associated with the requested group are available for the group voice call (step 72), and if not, the SU 50 can display the unavailable SU information (step 73) as well as optionally provide an audible notification and/or stop the call (step 74). In some embodiments, SUs that previously associated with the group but are not currently present may also be indicated to the initiating SU 50. Furthermore, in some embodiments, an option to continue the group call despite the unavailable SUs may be provided at step 73. If all the present SUs are available (step 72), the SU 50 can automatically initiate the group voice call by continuing the call setup (step 75).

Figure 6:
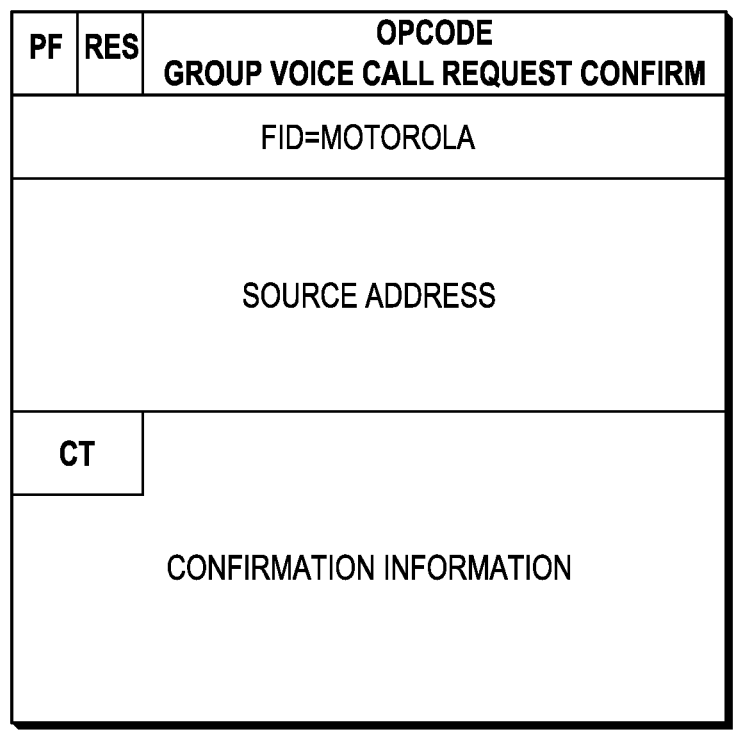

FIGS. 6-9 are block diagrams of various CSBKs 80, 82, 84, 86 for use with the processes described herein for group call confirmation messages. FIG. 6 illustrates a CSBK 80 for confirmation in a call setup. In the process 60, the infrastructure 12 sends a burst such as via the CSBK 80 to announce/grant the call. With the information from the call information server 10, the CSBK 80 can be expanded to include confirmation information such as two bits for confirmation type. An example of the confirmation type can be as follows:

| | |
|---|---|
| 00 | no confirmation, DMR standard |
| 01 | use full SU ID for confirmation |
| 10 | use short SU ID for confirmation |
| 11 | use bitmask for confirmation |

The confirmation type can include three different options (in addition to no confirmation). The confirmation type determines how the infrastructure 12 responds to the SU 50—either full SU identifiers (ID) (a full list of subscriber unit identifiers), short SU IDs (a short list of subscriber unit identifiers), or a bitmask. All of these options include the information from call information server 10 with the difference being how the SU 50 extracts and/or encodes the information.

FIG. 7 illustrates a CSBK 82 for full SU IDs included for confirmation, e.g. confirmation type=01 and a full 24 bit SU ID for confirmation. FIG. 8 illustrates a CSBK 84 for short SU IDs included for confirmation, e.g. confirmation type=10 and a short 8 bit SU ID for confirmation. With the short SU ID, each receiving SU has to decode the short SU IDs, and a possible technique can include a receiver list in each SU that is identified by the infrastructure 12 and the short SU ID is an index of the receiver list.

FIG. 9 illustrates a CSBK 86 with a bit mask for confirmation, e.g. confirmation type=11 and a bit mask (e.g. 256 bits) is used for confirmation. With the bit mask, again, each SU has to decode the bit mask. A possible technique can include defining a correct bit mask for the target group ID and using each bit in the mask to represent a SU (e.g., a bit set to false or 0 can indicate that the SU is not available). For example, typical bit mask can be 8 byte/256 bit and each bit stands for one SU. Here, the typical bit mask can represent a group of less than 256 members.

Figure 10:
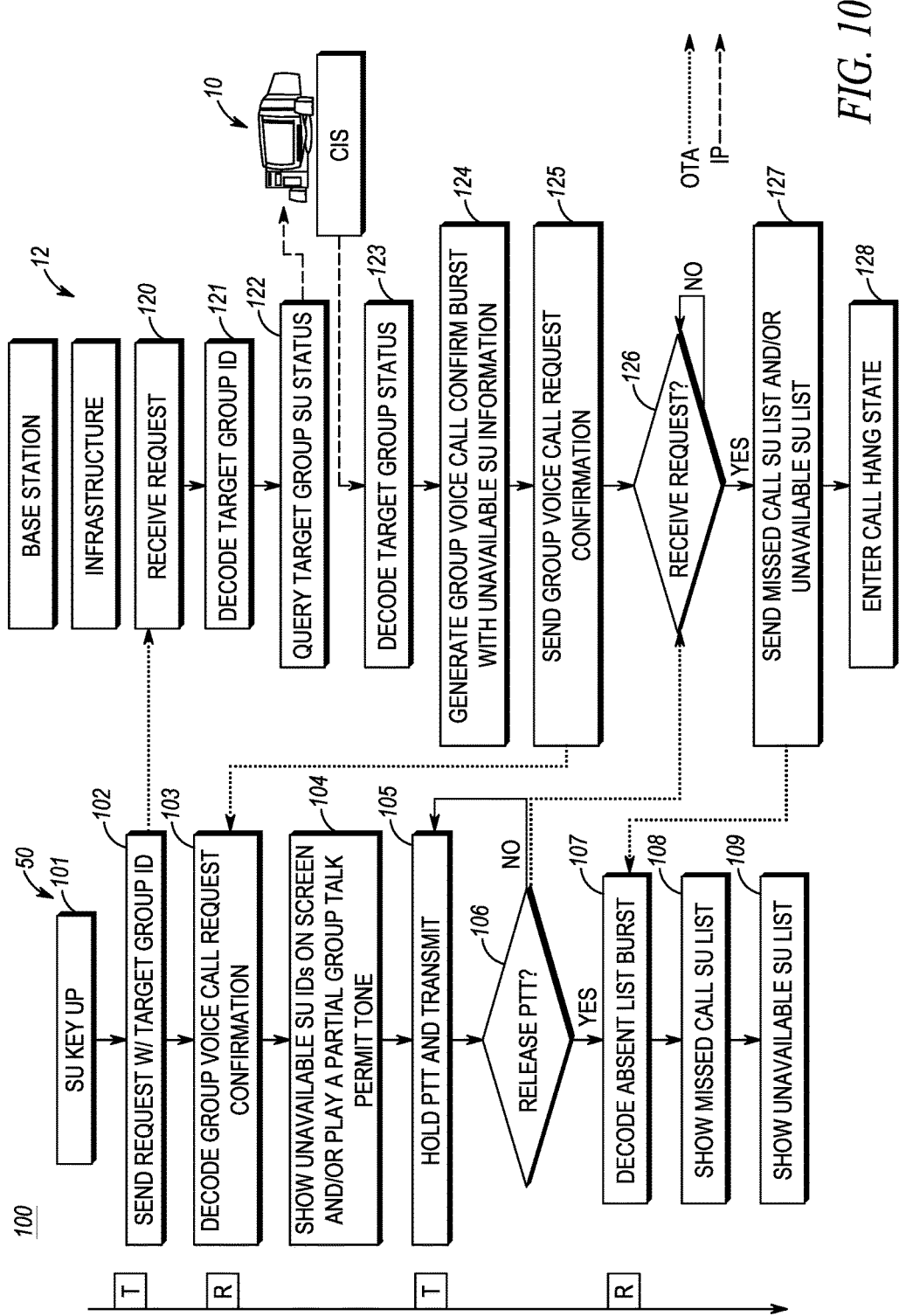
FIG. 10 is a flowchart of a process supporting group call confirmation after call setup in accordance with some embodiments.

FIG. 10 is a flowchart of a process 100 supporting group call confirmation after call setup. In some embodiments, more or fewer steps could be included in the process 100. The process 100 is shown with activity in an SU 50, activity in the infrastructure 12, activity with the call information server 10, and activity between the SU 50 and the infrastructure 12. First, activity is described in the SU 50. The SU 50 keys up (step 101) and sends a call request with a target group ID to the infrastructure 12 (step 102). The SU 50 receives and decodes a group voice call request confirm from the infrastructure 12 (step 103). As part of the group voice call request confirm, the SU 50 receives a list of the unavailable SUs for the call from the infrastructure 12. The SU 50 can show (i.e., display) unavailable SU IDs on a screen of the SU 50 and/or play a partial group talk permit tone (step 104). If there are any unavailable SUs in the group call, the user can be aware through new defined Partial-Group-Talk-Permit-Tone (PGTPT), and then start to talk At this point, the SU 50 knows who is not available for the call, and the SU 50 can hold PTT and transmit (step 105), and once PTT is released (step 106), the SU 50 can transmit a request to the infrastructure 12 for the unavailable SUs to join the call, i.e. a missed call SU list. The SU 50 receives and decodes the missed call SU list from a burst from the infrastructure 12, and the SU 50, from the burst, can show a missed call SU list where the SU is present and available (step 108) and an unavailable SU list (step 109) where the SU is present and unavailable or not present.

Concurrently with the activity in the SU 50, in the infrastructure 12, the infrastructure 12 receives the request from the SU 50 in the step 102 (step 120), decodes the target group ID from the request (step 121), and queries the target group SU status through the call information server 10 (step 122). The call information server 10 provides a response to the infrastructure 12 which decodes the target group status (step 123).

The infrastructure 12 generates a group voice call confirm burst with unavailable SU information (step 124), and sends the group voice call request confirm o the SU 50 (step 125). The infrastructure 12 can receive a request from the SU 50 during the call (when the PTT is released) for the unavailable SUs to join the call (step 126). The infrastructure 12 can send the missed call SU list and/or the unavailable SU list (step 127) and enter a call hang state (step128).

FIG. 11 is a block diagram of a Link Control (LC) format 150 for the group voice call request confirm t in the process 100. The LC format 150 includes an Opcode—Group Voice Call Request Confirm; MFID—Motorola MFID; Not Present SU #—number of not present SUs in this group call, such as due to power down, out of range, etc.; Busy SU #—number of busy SUs in this group call (unavailable), such as, busy in another ongoing group or individual call, etc.; and Late Entry SU#—number of late entry SUs to this group call (Optional).

Figure 12:
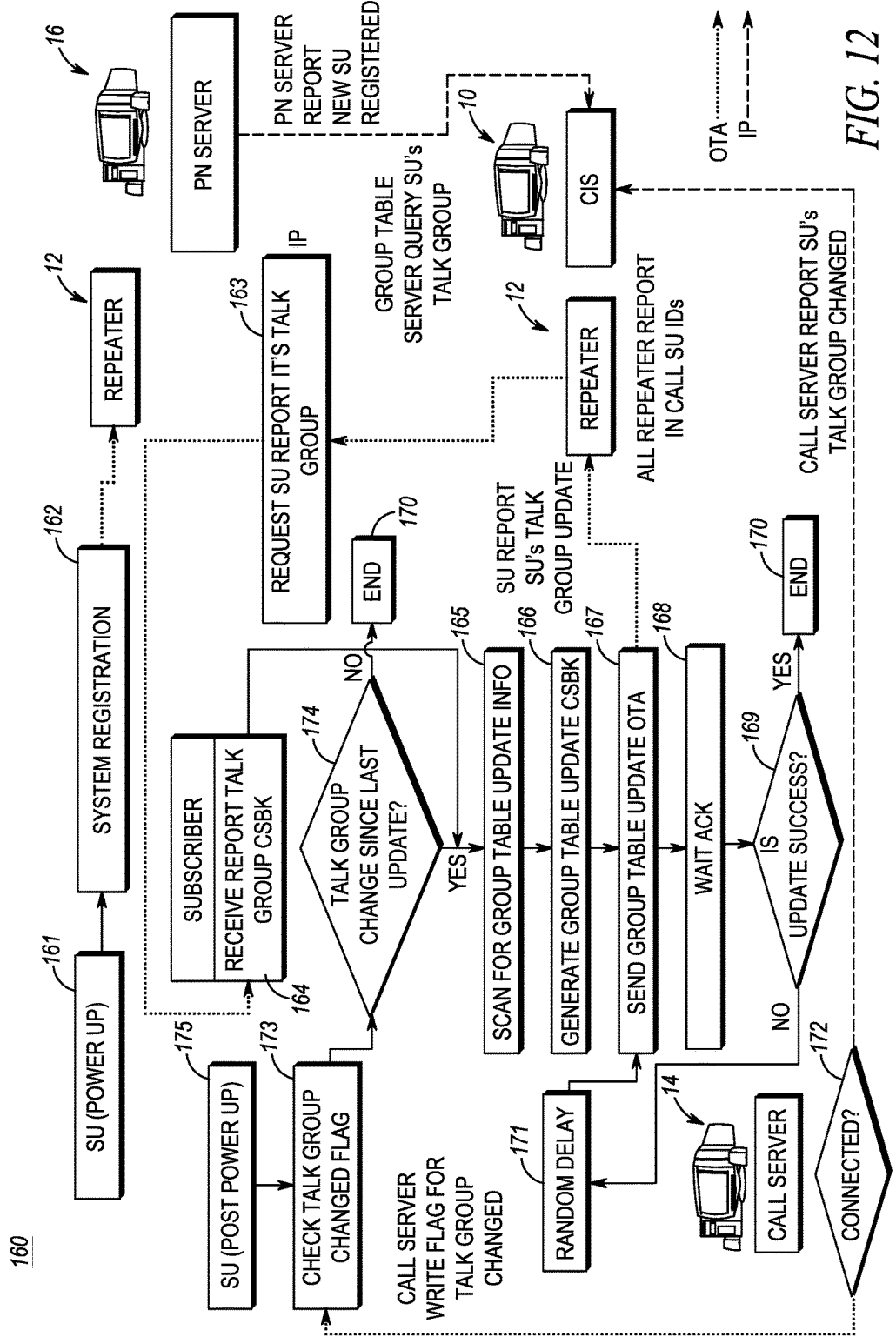
FIG. 12 is a flowchart of a process illustrating SU operation with the infrastructure and the call information server in accordance with some embodiments.

FIG. 12 is a flowchart of a process 160 illustrating the SU 50 operation with the infrastructure 12 and the call information server 10. In some embodiments, more or fewer steps could be included in the process 160. The SU powers up (step 161) and performs system registration (step 162) by communication with the infrastructure 12, such as a repeater which communicates the presence of the SU 50 to the PN server 16, a trunk controller, etc. The PN server 16 reports that a new SU is registered to the call information server 10.

The call information server 10, through the infrastructure 12, requests that the newly registered SU report its group (step 163) and transmits a report group CSBK to the SU (step 164), or otherwise retrieves group information from the infrastructure 12 for SU 50. In this example, the SU 50 receives the CSBK (step 164) and scans for its group table for update info (step 165), generates a group table update CSBK (based on its group table), and sends the group table update CSBK to the call information server 10 via an OTA interface through the infrastructure 12 (step 167).

The SU 50 waits for an acknowledgment (ACK) (step 168) from the infrastructure 12, and if the update is successful (step 169), the process 160 ends (step 170). If the update is unsuccessful (step 170), the call server 14 can prompt the SU 50 to retry communication to the call information server 10 after a random delay (step 171).

When the group changes for the SU 50, the call server 14 can update the call information server 10 with respect to the SU's group if the call server 14 is connected to the call information server 10 (step 172). If the call server 14 is not connected (step 172), the call server 14 can also send an OTA request with a group changed flag (step 173), and if the group has changed since the last update (step 174), the SU 50 can go to the step 165. Also, upon power up (step 175), the SU 50 can check the group changed flag as well.

Figure 13:
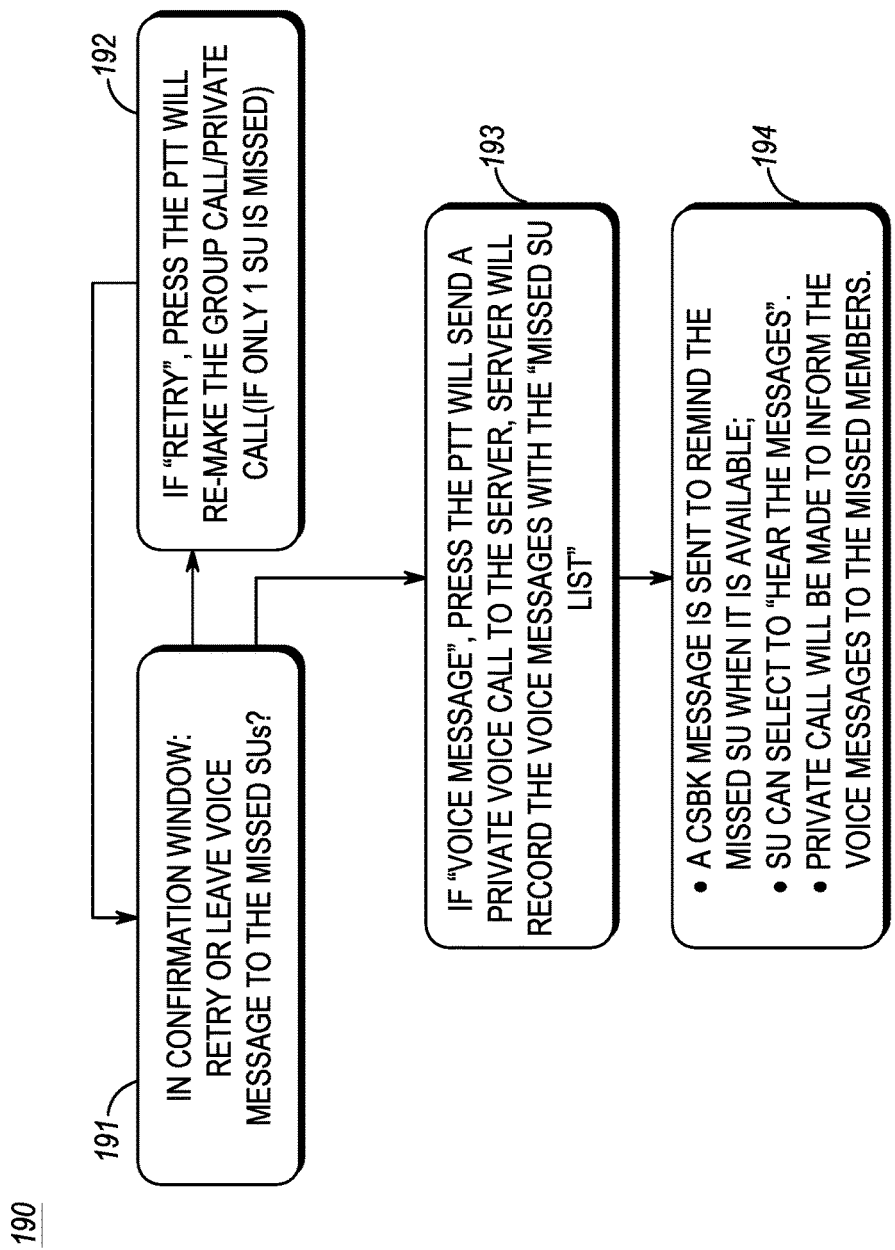
FIG. 13 is a flowchart of a process implemented by the SU subsequent to receiving a list of unavailable SUs from the infrastructure through the call information server in accordance with some embodiments.

FIG. 13 is a flowchart of a process 190 implemented by the SU 50 subsequent to receiving a list of unavailable SUs from the infrastructure 12 through the call information server 10 (e.g., at steps 104 or 109 of process 100). In some embodiments, more or fewer steps could be included in the process 190. The SU 50 can display a confirmation window: retry (unavailable SUs) or leave a voice message to the missed SUs (step 191). If a user selects "retry", the user can press the PTT to remake the group call or private call (if only one SU missed) (step 192). If the user selects "voice message", the user can press the PTT to send a private voice call to the call server 14 or the like (while concurrently having the voice call with the available SUs), and the call server 14 records the voice call as voice messages for the "Missed SU list" (step 193). A CSBK message is sent to remind the missed SU when it is available; the SU can select to "Hear the messages" and a private call will be made to inform the voice messages to the missed members (step 194).

FIG. 14 is a block diagram of an exemplary implementation of call information server 10. Specifically, the call information server 10 can implement the various processes described herein. Note also that the call server 14 and the PN server 16 can be implemented as described in FIG. 14, and in some embodiments, as same or separate devices as the call information server 10. The call information server 10 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 14 depicts the call information server 10 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications between the aforementioned components.

The processor 202 is a hardware device for executing software instructions. The processor 202 may be any custom made or commercially available processor, a central processing unit (CPU), an auxiliary processor among several processors associated with the call information server 10, a semiconductor-based microprocessor (in the form of a microchip or chip set), or generally any device for executing software instructions. When the call information server 10 is in operation, the processor 202 is configured to execute software stored within the memory 210, to communicate data to and from the memory 210, and to generally control operations of the call information server 10 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the call information server 10 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10GbE) or a wireless local area network (WLAN, LMR) card or adapter (e.g., 802.11a/b/g/n, P25). The network interface 206 may include address, control, and/or data connections to enable appropriate communications in the radio communication system 5. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the call information server 10 such as, for example, an internal hard drive connected to the local interface 212 in the call information server 10. Additionally in another embodiment, the data store 208 may be located external to the call information server 10 such as, for example, an external hard drive connected to the I/O interfaces 204 (e.g., SCSI or USB connection). In a further embodiment, the data store 208 may be connected to the call information server 10 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, including those call information server 10 steps described in FIGS. 1-13.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a call information server for a two-way radio system for confirming group call target subscriber unit participation in a group call initiated by a group initiator, the method comprising:
   accessing, by the server, group list information associating a plurality of subscriber units with one or more groups, each group including a plurality of target subscriber units associated with the group for receiving a group call;
   receiving, at the server, updates related to presence information setting forth whether each particular target subscriber unit in the group list information is online or offline and updates related to availability information setting forth whether each particular target subscriber unit in the group list information is busy on another call or is available for the receiving the group call;
   detecting, at the server, a request from an initiator subscriber unit for a particular group call to a particular group of a plurality of particular target subscriber units included in the group list information; and
   confirming, by the server after call setup, for each of the plurality of particular target subscriber units indicated in the particular group, the particular target subscriber unit's participation or lack of participation in the particular group call, as a function of the updates related to presence information, the updates related to availability information, and the group list information and providing, by the server after the group call, an indication of each particular target subscriber unit's confirmed participation or lack of participation in the particular group call to the initiator sub scriber unit.

2. The method of claim 1, wherein the updates related to the presence information, the availability information, and the group list information are received from at least one of infrastructure of the two-way radio system and a call server.

3. The method of claim 1, wherein availability information updates are received from a call server and indicate call start and call stop information for group and individual calls occurring in the two-way radio system and involving one or more of the particular target subscriber units.

4. The method of claim 1, wherein presence information updates are received from a trunk controller or a presence notification server.

5. The method of claim 1, further comprising providing, by the server to the initiator subscriber unit and after the group call, a link control (LC) format message that includes a total number of subscriber units not present for the particular group call and a total number of subscriber units unavailable for the particular group call.

6. The method of claim 5, wherein the LC format message further includes a total number of late entry subscriber units for the particular group call.

7. A call information server in a two-way radio system, comprising:
   a network interface communicatively coupled to a plurality of subscriber units through infrastructure of the two-way radio system;
   a processor communicatively coupled to the network interface; and
   memory storing computer executable instructions, and in response to execution by the processor, the computer executable instructions cause the processor to perform steps of:
      access group list information associating a plurality of subscriber units with one or more groups, each group including a plurality of target subscriber units associated with the group for receiving a group call;
      receive, via the network interface, updates related to presence information setting forth whether each particular target subscriber unit in the group list information is online or offline and updates related to availability information setting forth whether each particular target subscriber unit in the group list information is busy on another call or is available for the receiving the group call;

detect a request from an initiator subscriber unit for a particular group call to a particular group of a plurality of particular target subscriber units included in the group list information; and confirm, after call setup, for each of the plurality of particular target subscriber units indicated in the particular group, the particular target subscriber unit's participation or lack of participation in the particular group call, as a function of the updates related to presence information, the updates related to availability information, and the group list information and provide, after the group call, an indication of each particular target subscriber unit's confirmed participation or lack of participation in the particular group call to the initiator subscriber unit.

8. The call information server of claim 7, wherein the updates related to the presence information, the availability information, and the group list information are received from at least one of the infrastructure and a call server.

9. The call information server of claim 7, wherein availability information updates are received from a call server and indicate call start and call stop information for group and individual calls occurring in the two-way radio system and involving one or more of the particular target subscriber units.

10. The call information server of claim 7, wherein presence information updates are received from a trunk controller or a presence notification server.

11. The call information server of claim 7, the memory comprising further computer executable instructions cause the processor to perform steps of:

provide, to the initiator subscriber unit and after the group call, a link control (LC) format message that includes a total number of subscriber units not present for the particular group call and a total number of subscriber units unavailable for the particular group call.

12. The call information server of claim 11, wherein the LC format message further includes a total number of late entry subscriber units for the particular group call.

13. A two-way radio system, comprising:

a plurality of subscriber units communicatively coupled to an infrastructure; and a call information server communicatively coupled to the plurality of subscribers via a network interface, wherein the call information server comprises memory storing computer executable instructions, and in response to execution by a processor, the computer executable instructions cause the processor to perform steps of:

access group list information associating the plurality of subscriber units with one or more groups, each group including a plurality of target subscriber units associated with the group for receiving a group call;

receive, via the network interface, updates related to presence information setting forth whether each particular target subscriber unit in the group list information is online or offline and updates related to availability information setting forth whether each particular target subscriber unit in the group list information is busy on another call or is available for the receiving the group call;

detect a request from an initiator subscriber unit for a particular group call to a particular group of a plurality of particular target subscriber units included in the group list information; and confirm, after call setup, for each of the plurality of particular target subscriber units indicated in a particular group list as forming a particular group, the particular target subscriber unit's participation or lack of participation in the particular group call, as a function of the updates related to presence information, the updates related to availability information, and the group list information and provide, after the group call, an indication of each particular target subscriber unit's confirmed participation or lack of participation in the particular group call to the initiator subscriber unit.

14. The two-way radio system of claim 13, the memory comprising further computer executable instructions cause the processor to perform steps of:

provide, to the initiator subscriber unit and after the group call, a link control (LC) format message that includes a total number of subscriber units not present for the particular group call and a total number of subscriber units unavailable for the particular group call.

15. The two-way radio system of claim 14, wherein the LC format message further includes a total number of late entry subscriber units for the particular group call.

* * * * *